(12) United States Patent
Zeng

(10) Patent No.: US 10,748,251 B2
(45) Date of Patent: Aug. 18, 2020

(54) DISPLAY METHOD AND DISPLAY DEVICE

(71) Applicant: Shenzhen Tunkey Technology Co., Ltd., Shenzhen (CN)

(72) Inventor: RongYue Zeng, Shenzhen (CN)

(73) Assignee: Shenzhen Tunkey Technology Co., Ltd., Shenzhen (CN)

(*) Notice: Subject to any disclaimer, the term of this patent is extended or adjusted under 35 U.S.C. 154(b) by 126 days.

(21) Appl. No.: 16/163,827

(22) Filed: Oct. 18, 2018

(65) Prior Publication Data

US 2019/0139194 A1    May 9, 2019

(30) Foreign Application Priority Data

Nov. 8, 2017    (CN) .......................... 2017 1 1089367

(51) Int. Cl.
*G06K 9/00* (2006.01)
*G06T 3/60* (2006.01)
(Continued)

(52) U.S. Cl.
CPC .................. *G06T 3/60* (2013.01); *G06T 7/90* (2017.01); *G09G 3/005* (2013.01); *G09G 3/2003* (2013.01);
(Continued)

(58) Field of Classification Search
CPC ... G06T 3/60; G06T 7/90; G06T 2207/10024; G06F 13/00; G09G 2320/0242;
(Continued)

(56) References Cited

U.S. PATENT DOCUMENTS

| | | | |
|---|---|---|---|
| 5,107,408 A * | 4/1992 | Vernondier | ........... E04F 19/061 |
| | | | 362/219 |
| 6,335,714 B1 * | 1/2002 | Wang | ..................... G09G 3/003 |
| | | | 345/31 |

(Continued)

FOREIGN PATENT DOCUMENTS

| CN | 1873767 A | 12/2006 |
|---|---|---|
| CN | 101546506 A | 9/2009 |

(Continued)

OTHER PUBLICATIONS

Chinese office action dated May 8, 2019; Chinese application No. 201711089367.5.
(Continued)

*Primary Examiner* — Mahendra R Patel
(74) *Attorney, Agent, or Firm* — Dinsmore & Shohl LLP

(57) ABSTRACT

The present application provides display method and display device. The method includes: establishing a mapping relationship between positions of respective odd and even pixels in a rotation display area of the RGB light strip and respective odd and even pixel points in an image to be displayed and generating an odd and even radius scanning coordinate conversion table; performing pixel point sampling on the image and acquiring chrominance information corresponding to the positions of the respective odd and even pixels in the rotation display area according to the coordinate conversion table; extracting and refreshing display data of the RGB light strip according to a current rotation angle of the RGB light strip and the chrominance information during the rotation of the RGB light strip.

7 Claims, 6 Drawing Sheets

(51) Int. Cl.
*G09G 3/00* (2006.01)
*G06T 7/90* (2017.01)
*G09G 3/20* (2006.01)
*G09G 3/32* (2016.01)

(52) U.S. Cl.
CPC ...... *G09G 3/32* (2013.01); *G06T 2207/10024* (2013.01); *G09G 2300/0452* (2013.01); *G09G 2310/0224* (2013.01); *G09G 2320/0242* (2013.01); *G09G 2320/0666* (2013.01); *G09G 2340/0407* (2013.01); *G09G 2340/0435* (2013.01)

(58) Field of Classification Search
CPC ... G09G 2340/0407; G09G 2310/0224; G09G 2320/0666; G09G 2300/0452; G09G 2340/0435; G06K 15/02; G06K 9/209; G06K 1/121; H04N 1/56; H04N 1/034; H04N 1/54; H04N 13/349; H04N 13/302; H04N 13/324
USPC ........ 382/154, 303, 299, 254, 167; 348/243, 348/242
See application file for complete search history.

(56) References Cited

U.S. PATENT DOCUMENTS

| | | | | |
|---|---|---|---|---|
| 6,796,680 B1* | 9/2004 | Showers | ............... | F21V 15/013 362/240 |
| 7,210,818 B2* | 5/2007 | Luk | ........................ | H05B 45/20 362/231 |
| 8,922,791 B2* | 12/2014 | Silverbrook | ............... | B41J 2/14 358/1.1 |
| 8,933,959 B2* | 1/2015 | Brown | ................. | H04N 13/349 345/613 |
| 2008/0094828 A1* | 4/2008 | Shao | ......................... | F21S 4/20 362/219 |
| 2014/0085896 A1* | 3/2014 | Li | ............................. | F21S 4/28 362/249.04 |

FOREIGN PATENT DOCUMENTS

| | | | | | |
|---|---|---|---|---|---|
| CN | 201364707 | Y | | 12/2009 | |
| CN | 101866598 | A | | 10/2010 | |
| CN | 102354480 | A | | 2/2012 | |
| CN | 102915682 | A | * | 2/2013 | |
| CN | 103680342 | A | | 3/2014 | |
| CN | 204003538 | U | | 12/2014 | |
| CN | 104732592 | A | | 6/2015 | |
| CN | 105845050 | A | | 8/2016 | |
| GB | 2432707 | A | | 5/2007 | |
| GB | 2432707 | A | * | 5/2007 | ............. G03B 25/00 |
| GB | 2437564 | A | * | 10/2007 | ............... G09F 9/33 |
| GB | 201507979 | | * | 6/2015 | ............. G09G 3/005 |
| WO | WO-9912354 | A1 | * | 3/1999 | ....... G08B 13/19673 |
| WO | 2016181134 | A1 | | 11/2016 | |
| WO | WO-2016181134 | A1 | * | 11/2016 | ............. G09G 3/005 |

OTHER PUBLICATIONS

Extended European search report dated Apr. 12, 2018, Application No. 18197012.0-1209.

* cited by examiner

DISPLAY METHOD AND DISPLAY DEVICE

CROSS REFERENCE TO RELATED APPLICATION

This application claims priority to Chinese Patent Application No. 201711089367.5, filed on Nov. 8, 2017, entitled "display method and device of a rotary RGB light strip using diametrically staggered sampling and computer readable storage medium", which is hereby incorporated by reference into this application as if fully set forth herein.

FIELD OF THE APPLICATION

The present application relates to the technical field of image display, especially to display method and display device.

BACKGROUND OF THE INVENTION

As a common information transmission tool, LED display screens can display information to people and play the role of prompting and decoration. However, existing LED display screens are mostly based on dot matrix row and column scanning or liquid crystal row and column scanning, which present a flat display effect if the user watches with naked eyes, and cannot display the spatial stereo effect.

SUMMARY OF THE INVENTION

In view of the above, the present application provides a display method and display device, so as to solve the above-mentioned problem that existing LED display screens are mostly based on dot matrix row and column scanning or liquid crystal row and column scanning, which present a flat display effect if the user watches with naked eyes, and cannot display the spatial stereo effect.

According to one aspect, the present application provides a display method, wherein the method is applied to a display device comprising a processor, a rotation driving device coupled to the processor and an RGB light strip; the rotation driving device comprises a driving motor and a rotary shaft coupled to the driving motor; a center of the RGB light strip is fixed on the rotary shaft; the rotary shaft driven by the driving motor drives the RGB light strip to perform rotation display at a preset rotation step angle; the RGB light strip contains an odd radius light strip and an even radius light strip, the odd radius light strip displaying odd pixel points in the image to be displayed, the even radius light strip displaying even pixel points in the image to be displayed; wherein the display method comprises using the processor to perform the following steps of:

establishing a mapping relationship between positions of respective odd and even pixels in a rotation display area of the RGB light strip and respective odd and even pixel points in the image to be displayed and generating an odd and even radius scanning coordinate conversion table;

performing pixel point sampling on the image to be displayed and acquiring chrominance information corresponding to the positions of the respective odd and even pixels in the rotation display area according to the odd and even radius scanning coordinate conversion table;

extracting and refreshing display data of the RGB light strip according to a current rotation angle of the RGB light strip and the chrominance information corresponding to the positions of respective odd and even pixels in the rotation display area during the rotation of the RGB light strip.

According to another aspect, the present application provides a display device comprising a processor, a rotation driving device coupled to the processor and an RGB light strip; the rotation driving device comprises a driving motor and a rotary shaft coupled to the driving motor; a center of the RGB light strip is fixed on the rotary shaft; the rotary shaft driven by the driving motor drives the RGB light strip to perform rotation display at a preset rotation step angle; the RGB light strip contains an odd radius light strip and an even radius light strip, the odd radius light strip displaying odd pixel points in the image to be displayed, the even radius light strip displaying even pixel points in the image to be displayed; the processor comprises:

a coordinate conversion table generation unit used for establishing a mapping relationship between positions of respective odd and even pixels in a rotation display area of the RGB light strip and respective odd and even pixel points in the image to be displayed and generating an odd and even radius scanning coordinate conversion table;

a pixel data stream sampling unit used for performing pixel point sampling on the image to be displayed according to the odd and even radius scanning coordinate conversion table, and acquiring chrominance information corresponding to the positions of the respective odd and even pixels in the rotation display area; and a display control unit used for extracting and refreshing display data of the RGB light strip according to a current rotation angle of the RGB light strip and the chrominance information corresponding to the positions of respective odd and even pixels in the rotation display area during the rotation of the RGB light strip.

According to a third aspect, the present application provides a display device comprising a memory, a processor and a computer program stored in the memory and executed by the processor, wherein when the processor executes the computer program the steps of the method as described in the first aspect are implemented.

According to a fourth aspect, the present application provides a computer readable storage medium having computer program stored therein, wherein the computer program implements the steps of the method as described in the first aspect when executed by a processor.

In the present application, firstly a mapping relationship between positions of respective odd and even pixels in an rotation display area of the RGB light strip and respective odd and even pixel points in an image to be displayed is established and an odd and even radius scanning coordinate conversion table is generated, where the RGB light strip is composed of an odd radius light strip and an even radius light strip, the odd radius light strip scanning odd pixel points in the image to be displayed, the even radius light strip scanning even pixel points in the image to be displayed. Secondly, pixel point sampling on the image to be displayed is performed and chrominance information corresponding to the positions of the respective odd and even pixels in the rotation display area is acquired according to the odd and even radius scanning coordinate conversion table. Finally, display data of the RGB light strip is extracted and refreshed according to a current rotation angle of the RGB light strip and the chrominance information corresponding to the positions of respective odd and even pixels in the rotation display area during the rotation of the RGB light strip. Thus a three-dimensional, cool experience when it is watched by the naked eyes can be brought to people, and the user's visual experience can be enhanced. In addition, due to the use of a diametrically staggered light strip with rotary scanning display mode, the resolution of the displayed image may be doubled.

BRIEF DESCRIPTION OF THE DRAWINGS

In order to explain the technical solutions of the embodiments of the present application more clearly, drawings required being used in the descriptions of the embodiments and the prior art are briefly introduced as follows. Obviously, the drawings described as follows are merely some embodiments of the present application. Those skilled in the art can obtain other drawings on the basis of these drawings without paying any creative work.

DETAILED DESCRIPTION OF THE PREFERRED EMBODIMENTS

In the following description, for the purpose of illustration instead of limitation, specific details such as specific system structures, techniques, and the like are set forth to provide a thorough understanding of the embodiments of the present application. However, it should be apparent to those skilled in the art that the present application may be practiced in other embodiments without these specific details. In other instances, detailed descriptions of well-known systems, devices, circuits, and methods are omitted to avoid obscuring the description of the present application.

In order to explain the technical solutions in the present application, embodiments of the present application will be described.

Figure 1:
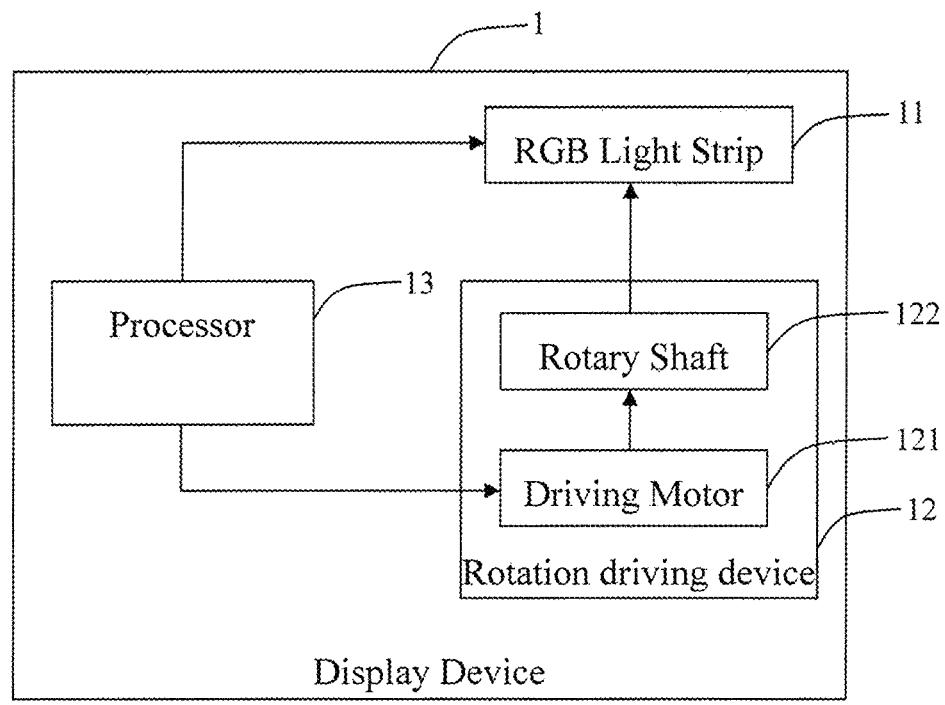
FIG. 1 is a schematic structural diagram of a display device according to an embodiment of the present application.

FIG. 1 is a schematic structural diagram of a display device according to an embodiment of the present application. Only the parts related to this embodiment are shown for convenience of explanation.

Referring to FIG. 1, the display device 1 provided in the embodiment includes a processor 13, a rotation driving device 12 coupled to the processor 13 and an RGB light strip 11. The rotation driving device 12 includes a driving motor 121 and a rotary shaft 122 coupled to the driving motor 121.

A center of the RGB light strip 11 is fixed on the rotary shaft 122. The rotary shaft 122, driven by the driving motor 121, drives the RGB light strip 11 to perform rotation display at a preset rotation step angle.

The rotation driving motor 121 is controlled by the processor 13 to drive the rotary shaft 122 to rotate the RGB light strip 11 in a clockwise or counterclockwise direction according to the preset rotation step angle. Every time the RGB light strip 11 rotates an angle, the processor 13 acquires current rotary angular position of the RGB light strip once and refreshes the display data of the RGB light strip once according to the current rotary angular position of the RGB light strip 11.

The RGB light strip 11 includes a light pole and a plurality of RGB light beads linearly fixed on the light pole, and the processor 13 may control the chrominance value of the RGB light beads via PWM technology.

Figure 2:
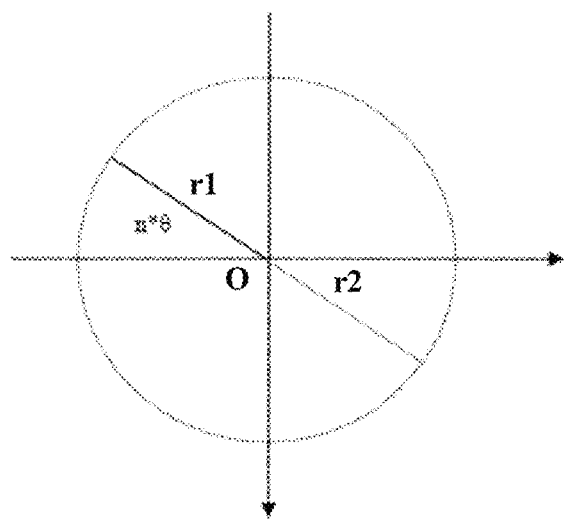
FIG. 2 is a schematic structural diagram of an RGB light strip of a display device according to an embodiment of the present application.
Figure 3:
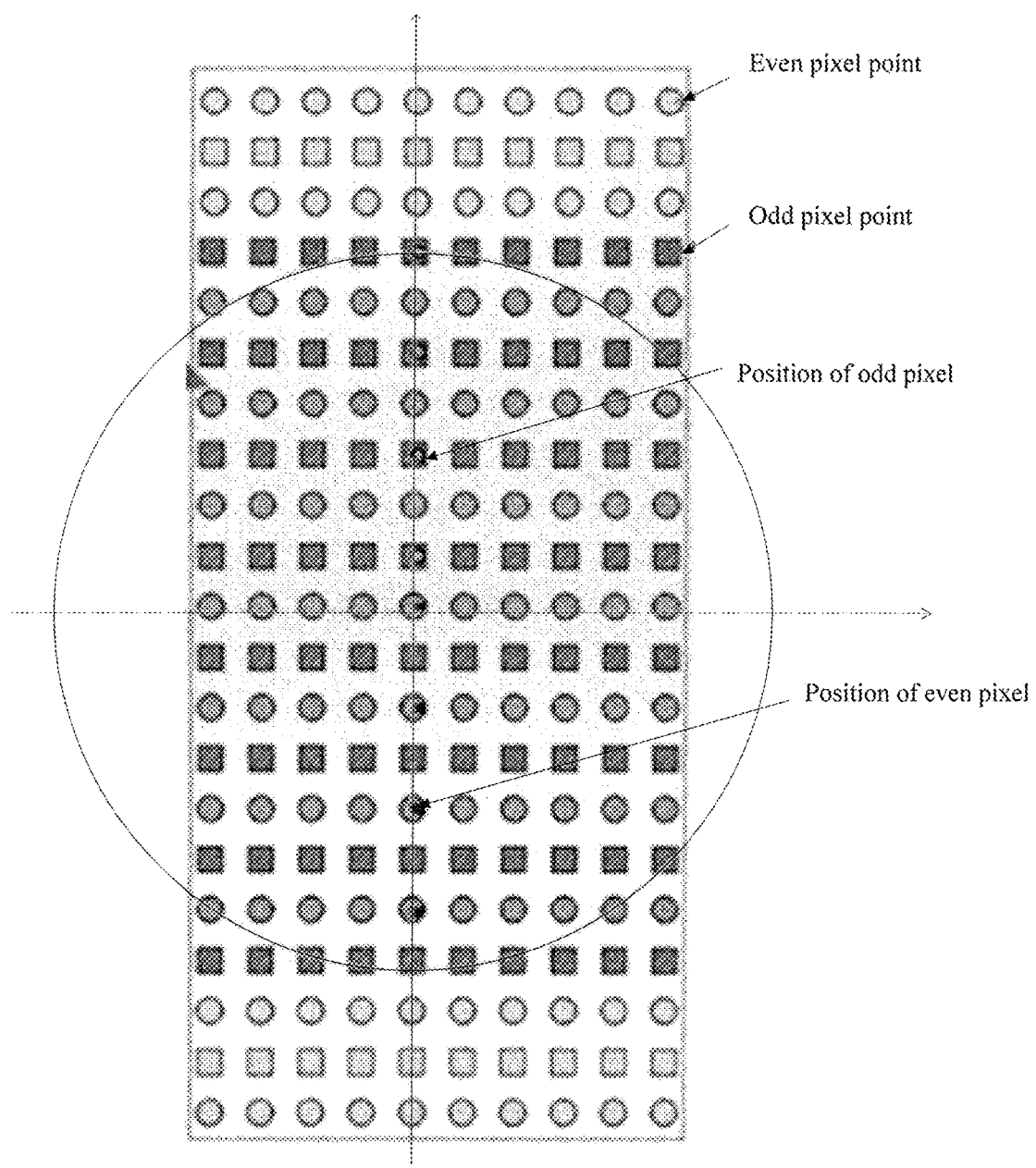
FIG. 3 is a schematic diagram of positions of odd and even pixels scanned by a rotary RGB light strip according to an embodiment of the present application.

Further, as shown in FIG. 2, in the embodiment, the RGB light beads linearly fixed on the light post of the RGB light strip are equally divided into an odd radius light strip r1 and an even radius light strip r2. The odd radius light strip r1 displays odd pixel points in the image to be displayed and the even radius light strip r2 displays even pixel points in the image to be displayed. A schematic diagram of the scanning rule of the odd radius light strip r1 and the even radius light strip r2 can be seen in FIG. 3, in which the circles represent the even pixel points in the image to be displayed, the squares represent the odd pixel points in the image to be displayed, the part of the RGB light strip in the upper semicircle of the rotation display area is the odd radius light strip r1, through which sampling to the odd pixel points in the image to be displayed is performed, and the small circle shown in the upper semicircle of the rotation display area represents the position of the odd pixel sampled by the odd radius light strip r1. The part of the RGB light strip in the lower semicircle of the rotation display area is the even radius light strip r2, through which sampling to the even pixel points in the image to be displayed is performed, and the small square shown in the lower semicircle of the rotation display area represents the position of the even pixel sampled by the even radius light strip r2.

The implementation process of a display method according to an embodiment of the present application will be descried with reference to the display device shown in FIG. 1.

Figure 4:
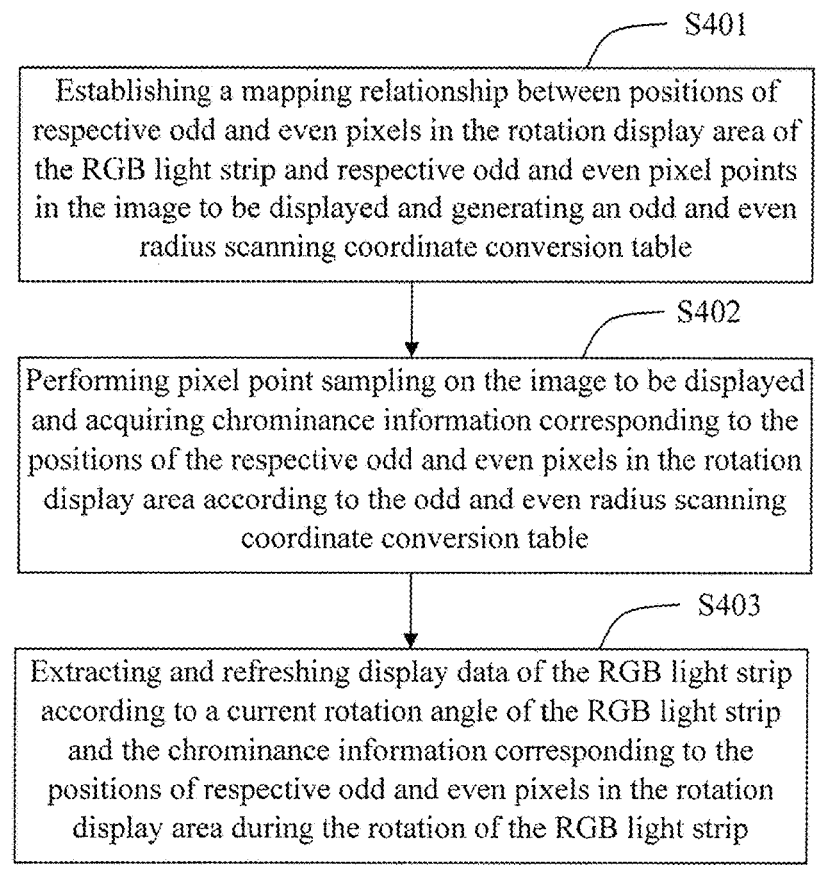
FIG. 4 is a schematic flow diagram of a display method of a rotary RGB light strip according to an embodiment of the present application.

Referring to FIG. 4, a schematic flow diagram of a display method according to an embodiment of the present application is shown. The execution body of the method is the processor in the display device shown in FIG. 1. As shown in FIG. 4, the display method according to the embodiment may include the following steps of.

Figure 5:
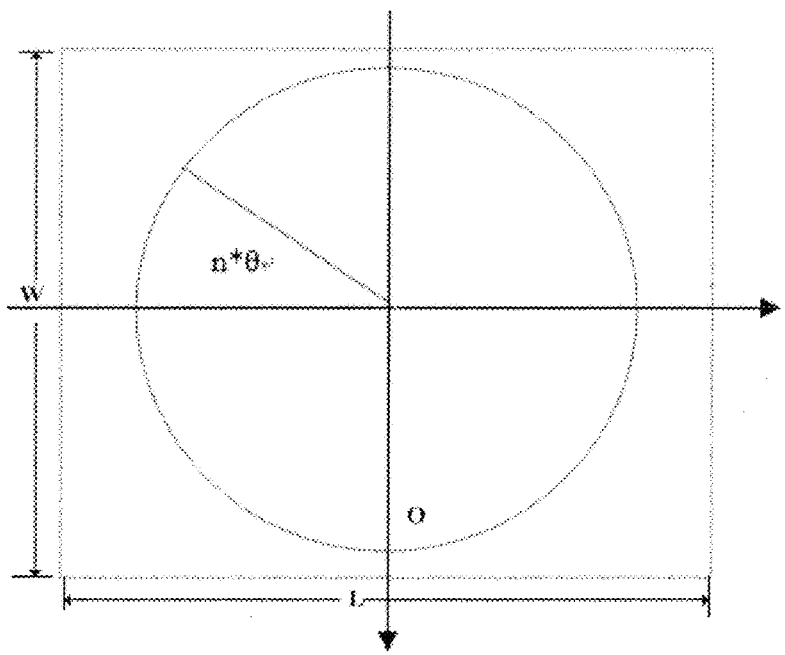
FIG. 5 is a schematic diagram of a memory extraction coordinate system in a display method of a rotary RGB light strip according to an embodiment of the present application.

Step S401, establishing a mapping relationship between positions of respective odd and even pixels in the rotation display area of the RGB light strip and respective odd and even pixel points in the image to be displayed and generating an odd and even radius scanning coordinate conversion table;

FIG. 5 shows a schematic diagram of a memory extraction coordinate system. As shown in FIG. 5, in the embodiment, the rotation display area is a circular area with the RGB light strip as a diameter and the center of the RGB light strip as a center. The image to be displayed is a rectangular area of length L and width W, where n*θ is the pixel sampling accuracy of the RGB light strip.

The positions of the respective odd pixels in the rotation display area refers to the positions of the RGB light beads in the odd radius light strip of the RGB light strip under respective rotation angles during the rotation of the RGB light strip at a preset rotation step angle.

The positions of the respective even pixels in the rotation display area refers to the positions of the RGB light beads in the even radius light strip of the RGB light strip under respective rotation angles during the rotation of the RGB light strip at a preset rotation step angle.

In specific applications, the pixels outside the rotation display area will be discarded if the area of the image to be displayed is larger than the area of the rotation display area, and the RGB light beads on the RGB light strip outside the image to be displayed will be not illuminated if the area of the image to be displayed is smaller than the area of the rotation display area.

Preferably, in a particular application, step S401 particularly includes:

establishing a plane rectangular coordinate system with the center of the image to be displayed as the origin, the length direction of the image to be displayed being the x-axis, and the width direction of the image to be displayed being the y-axis;

dividing the pixel points in the image to be displayed into odd pixel points and even pixel points according to the number of the row where the pixel point locates in the image to be displayed;

acquiring the coordinate values of the respective odd and even pixel points in the image to be displayed in the plane rectangular coordinate system;

converting the coordinate values of the respective odd and even pixel points in the image to be displayed into polar coordinate values via coordinate transformation;

establishing a polar coordinate system with the center of the RGB light strip as the pole;

acquiring the polar coordinate values of the positions of the respective odd and even pixels in the rotation display area of the RGB light strip in the polar coordinate system according to the rotation step angle;

establishing the mapping relationship between the positions of the respective odd and even pixels in the rotation display area and the pixel points in the image to be displayed and generating the odd and even radius scanning coordinate conversion table according to the polar coordinate values of the respective odd and even pixel points in the image to be displayed and the polar coordinate values of the positions of the respective odd and even pixels in the rotation display area.

Preferably, in another particular application, step S401 particularly includes:

establishing a plane rectangular coordinate system with the center of the image to be displayed as the origin, the length direction of the image to be displayed being the x-axis, and the width direction of the image to be displayed being the y-axis;

dividing pixel points in the image to be displayed into odd pixel points and even pixel points according to the number of the row where the pixel point locates in the image to be displayed;

acquiring the coordinate values of the respective odd and even pixel points in the image to be displayed in the plane rectangular coordinate system;

establishing a polar coordinate system with the center of the RGB light strip as the pole;

acquiring the polar coordinate values of the positions of the respective odd and even pixels in the rotation display area of the RGB light strip in the polar coordinate system according to the rotation step angle;

converting the polar coordinate values of the positions of the respective odd and even pixels in the rotation display area into coordinate values via coordinate transformation;

establishing the mapping relationship between the positions of the respective odd and even pixels in the rotation display area and the pixel points in the image to be displayed and generating the odd and even radius scanning coordinate conversion table according to the coordinate values of the respective odd and even pixel points in the image to be displayed and the coordinate values of the positions of the respective odd and even pixels in the rotation display area.

Step S402, performing pixel point sampling on the image to be displayed and acquiring chrominance information corresponding to the positions of the respective odd and even pixels in the rotation display area according to the odd and even radius scanning coordinate conversion table.

In the embodiment, after acquiring the odd and even radius scanning coordinate conversion table, the processor may acquire, according to the odd and even radius scanning coordinate conversion table, the coordinate values of the pixel points in the image to be displayed corresponding to the positions of the respective odd and even pixels in the rotation display area. Then chrominance information of the pixel points in the image to be displayed is collected according to the coordinate values of the pixel points and association relation between the chrominance information and the positions of the corresponding pixels in the rotation display area is established and saved in order to subsequently control the RGB light beads to display according to the chrominance information corresponding to the positions of the pixels when the RGB light beads in the RGB light strip is rotated to the positions of the pixels.

Step S403, extracting and refreshing display data of the RGB light strip according to a current rotation angle of the RGB light strip and the chrominance information corresponding to the positions of respective odd and even pixels in the rotation display area during the rotation of the RGB light strip.

In this embodiment, the RGB light strip is rotated by the preset rotation step angle under the driving of the rotary shaft. Each time the RGB strip is rotated by one step angle, the processor reads a current rotation angle of the RGB strip, then determines current positions of pixels of respective RGB beads in the odd and even radius light strips according to the current rotation angle of the RGB light strip, obtain the chromaticity information that should be displayed by the current respective RGB light beads according to the current positions of the pixels of respective RGB beads and the chromaticity information corresponding to respective pixel position in the rotation display area, and finally refreshes the display data of the RBG light strip using the obtained chromaticity information that should be displayed by the respective RGB light beads. Thus, after the 360 degree rotation, the display device could present the image to be display to the user in a three-dimensional effect when it is watched by the naked eyes and the user's visual experience can be enhanced. In addition, due to the use of diametrically staggered light strip with rotary scanning display mode, the resolution of the displayed image may be doubled.

As can be seen from the above description, in the display method according to the embodiment, firstly a mapping relationship between positions of respective odd and even pixels in a rotation display area of the RGB light strip and respective odd and even pixel points in an image to be displayed is established and an odd and even radius scanning coordinate conversion table is generated, where the RGB light strip is composed of an odd radius light strip and an even radius light strip, the odd radius light strip scanning odd pixel points in the image to be displayed, the even radius light strip scanning even pixel points in the image to be displayed. Secondly, pixel point sampling on the image to be displayed is performed and chrominance information corresponding to the positions of the respective odd and even pixels in the rotation display area is acquired according to the odd and even radius scanning coordinate conversion table. Finally, the display data of the RGB light strip is extracted and refreshed according to a current rotation angle of the RGB light strip and the chrominance information corresponding to the positions of respective odd and even pixels in the rotation display area during the rotation of the RGB light strip. Thus a three-dimensional, cool experience when it is watched by the naked eyes can be brought to people, and the user's visual experience can be enhanced. In addition, due to the use of a diametrically staggered light strip with rotary scanning display mode, the resolution of the displayed image may be doubled.

Figure 6:
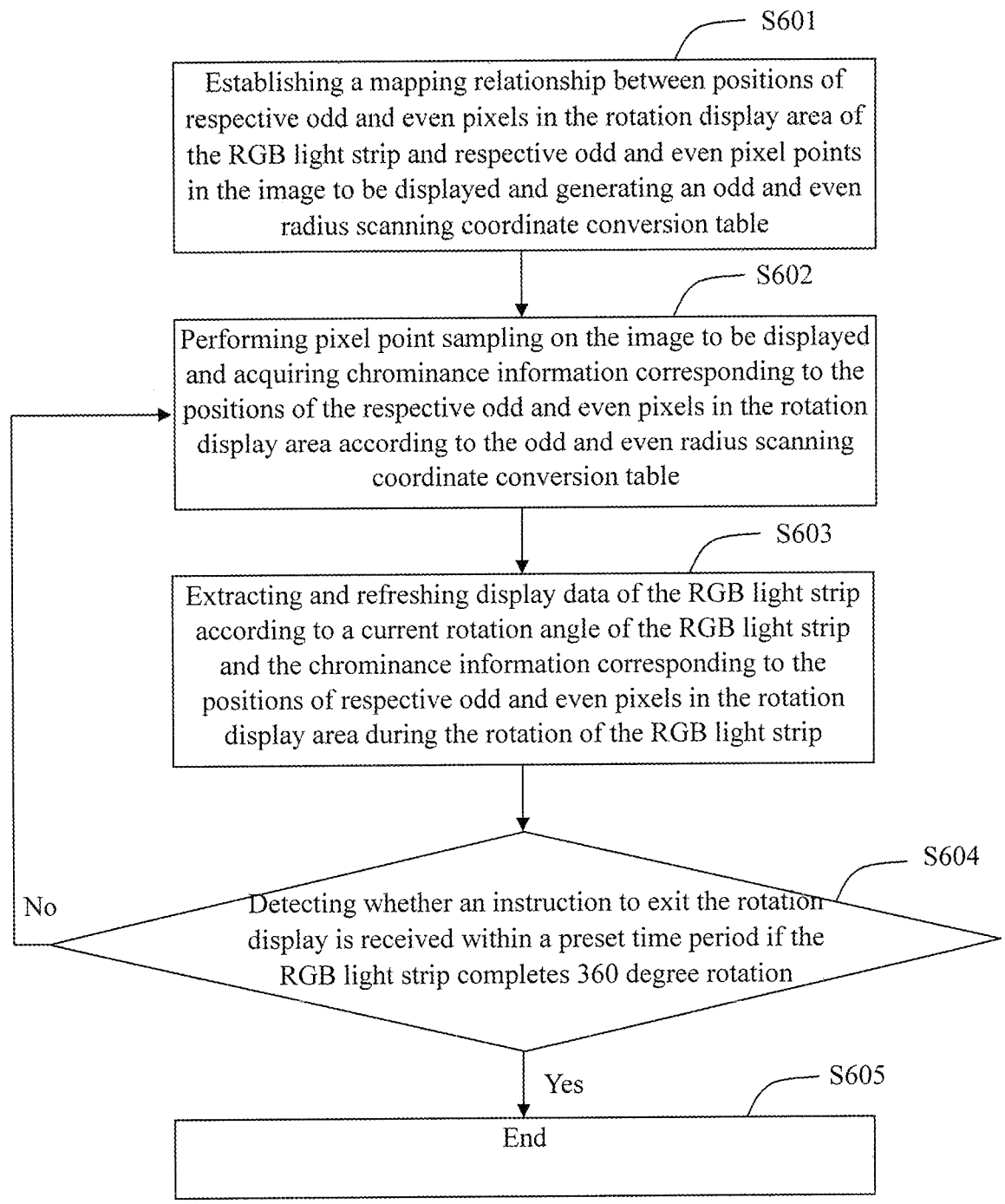
FIG. 6 is a schematic flow diagram of a display method of a rotary RGB light strip according to another embodiment of the present application.

FIG. 6 is a schematic flow diagram of a display method according to another embodiment of the present application. The execution body of the method is the processor of the display device in FIG. 1. As shown in FIG. 6, steps S601 to S603 in this embodiment are not described here as being the same as steps S601 to S603 in the previous embodiment. Compared to the previous embodiment, after step S603, the display method according to this embodiment further includes:

Step S604, detecting whether an instruction to exit the rotation display is received within a preset time period if the RGB light strip completes 360 degree rotation, returning to the step S602 if the instruction to exit the rotation display is not received within the preset time period and executing step S605 if the instruction to exit the rotation display is received.

Step S605, ending the process.

In this embodiment, after the RGB light strip completes 360 degree rotation, the display device completes one rotation period display. At this time, if the instruction to exit the rotation display is not received within the preset time period, the process of extracting and refreshing the pixels of the pixel points in the image to be displayed corresponding to the positions of the respective odd and even pixels in the rotation display area is re-entered and the rotation display is continued. If the 360 degree rotation is not completed, step S603 is continued.

Compared with the previous embodiment, in the display method according to this embodiment, after the RGB light strip completes 360 degree rotation, the process of extracting and refreshing the pixels of the pixel points in the image to be displayed corresponding to the positions of the respective odd and even pixels in the rotation display area is re-entered and the rotation display is continued if the instruction to exit the rotation display is not received within the preset time period, therefore dynamic stereoscopic display effect may be brought to people when it is watched by the naked eyes, which further enhances the user's visual experience.

Figure 7:
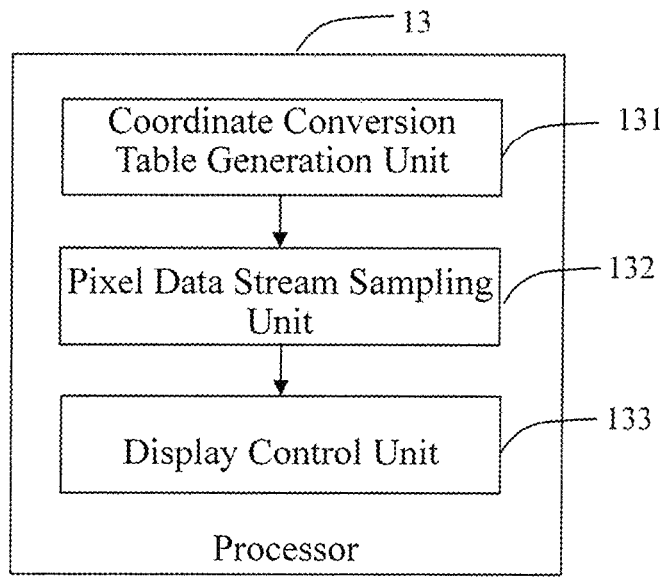
FIG. 7 is a schematic structural diagram of a processor in a display device of a rotary RGB light strip according to an embodiment of the present application.

FIG. 7 is a schematic structural diagram of a processor in the display device according to an embodiment of the present application. Only the parts related to the present embodiment are shown for convenience of explanation.

Referring to FIG. 7, in this embodiment, the processor 13 includes:

a coordinate conversion table generating unit 131 used for establishing a mapping relationship between positions of respective odd and even pixels in a rotation display area of the RGB light strip and respective odd and even pixel points in the image to be displayed and generating an odd and even radius scanning coordinate conversion table;

a pixel data stream sampling unit 132 used for performing pixel point sampling on the image to be displayed and acquiring chrominance information corresponding to the positions of the respective odd and even pixels in the rotation display area according to the odd and even radius scanning coordinate conversion table;

a display control unit 133 used for extracting and refreshing display data of the RGB light strip according to a current rotation angle of the RGB light strip and the chrominance information corresponding to the positions of respective odd and even pixels in the rotation display area during the rotation of the RGB light strip.

Optionally, the coordinate conversion table generation unit 131 is particularly used for:

establishing a plane rectangular coordinate system with the center of the image to be displayed as the origin, the length direction of the image to be displayed being the x-axis, and the width direction of the image to be displayed being the y-axis;

dividing pixel points in the image to be displayed into odd pixel points and even pixel points according to the number of the row where the pixel point locates in the image to be displayed;

acquiring coordinate values of the respective odd and even pixel points in the image to be displayed in the plane rectangular coordinate system;

converting the coordinate values of the respective odd and even pixel points in the image to be displayed into polar coordinate values via coordinate transformation;

establishing a polar coordinate system with the center of the RGB light strip as the pole;

acquiring the polar coordinate values of the positions of the respective odd and even pixels in the rotation display area of the RGB light strip in the polar coordinate system according to the rotation step angle;

establishing the mapping relationship between the positions of the respective odd and even pixels in the rotation display area and the pixel points in the image to be displayed and generating the odd and even radius scanning coordinate conversion table according to the polar coordinate values of the respective odd and even pixel points in the image to be displayed and the polar coordinate values of the positions of the respective odd and even pixels in the rotation display area.

Optionally, the coordinate conversion table generation unit 131 is particularly used for:

establishing a plane rectangular coordinate system with the center of the image to be displayed as the origin, the length direction of the image to be displayed being the x-axis, and the width direction of the image to be displayed being the y-axis;

dividing pixel points in the image to be displayed into odd pixel points and even pixel points according to the number of the row where the pixel point locates in the image to be displayed;

acquiring coordinate values of the respective odd and even pixel points in the image to be displayed in the plane rectangular coordinate system;

establishing a polar coordinate system with the center of the RGB light strip as the pole;

acquiring polar coordinate values of the positions of the respective odd and even pixels in the rotation display area of the RGB light strip in the polar coordinate system according to the rotation step angle;

converting the polar coordinate values of the positions of the respective odd and even pixels in the rotation display area into coordinate values via coordinate transformation;

establishing the mapping relationship between the positions of the respective odd and even pixels in the rotation display area and the pixel points in the image to be displayed and generating the odd and even radius scanning coordinate conversion table according to the coordinate values of the respective odd and even pixel points in the image to be displayed and the coordinate values of the positions of the respective odd and even pixels in the rotation display area.

Figure 8:
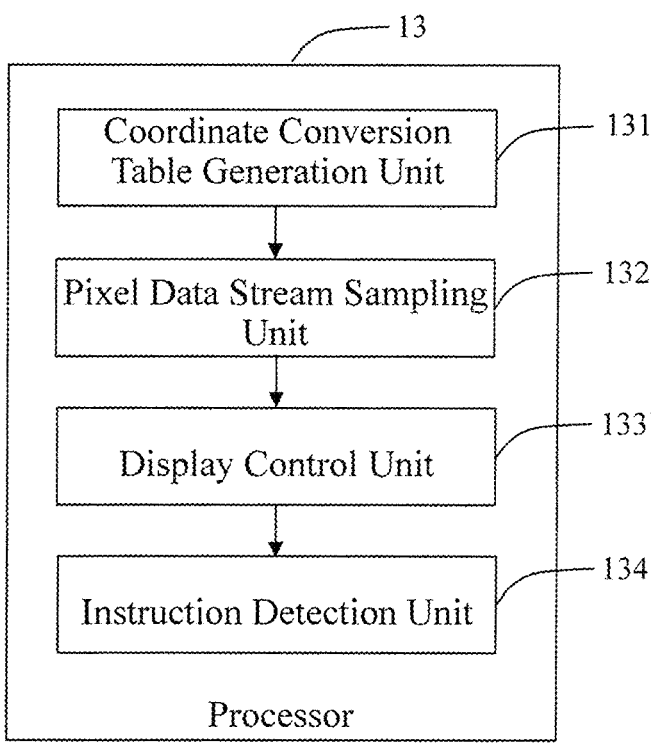
FIG. 8 is a schematic structural diagram of a processor in a display device of a rotary RGB light strip according to another embodiment of the present application.

Optionally, referring to FIG. 8, in another embodiment, the processor 13 further includes an instruction detection unit 134 used for:

detecting whether an instruction to exit the rotation display is received within a preset time period in the case that the RGB light strip completes 360 degree rotation;

controlling the pixel data sampling unit to perform pixel point sampling on the image to be displayed and acquire chrominance information corresponding to the positions of the respective odd and even pixels in the rotation display area according to the odd and even radius scanning coordinate conversion table again in the case that the instruction to exit the rotation display is not received within the preset time period;

turning off the rotation display function of the display device in the case that the instruction to exit the rotation display is received.

It should be noted that the units in the above-described devices according to the embodiments of the present application are based on the same concept as the method embodiments of the present application, and the technical effects thereof are the same as the method embodiments of the present application. The detailed content may refer to the description in the method embodiments of the present application and will not be repeatedly described here.

Therefore, it may be seen that the display device according to the embodiment of the present application can also give people a three-dimensional, cool experience when it is watched by the naked eyes, and enhance the user's visual experience. In addition, due to the use of a diametrically staggered light strip with rotary scanning display mode, the resolution of the displayed image may be doubled.

It should be understood that the sequence numbers of the steps in the above embodiments do not imply the order of execution. The order of execution of the steps should be determined by its function and internal logic, and should not limit the execution process of the embodiments of the present application.

Figure 9:
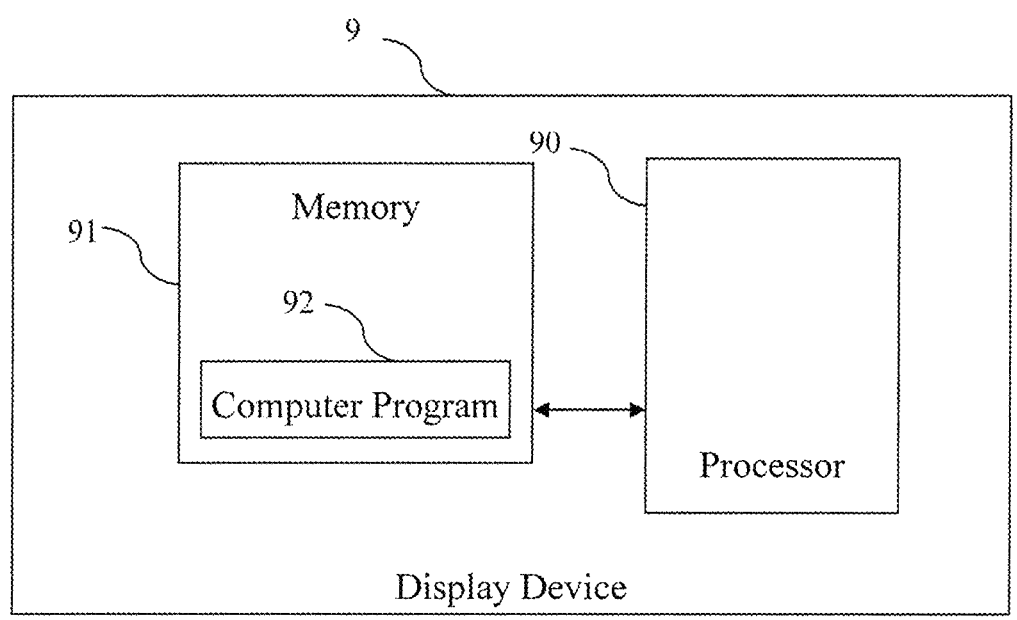
FIG. 9 is a schematic structural diagram of a display device of a rotary RGB light strip according to yet another embodiment of the present application.

FIG. 9 is a schematic diagram of a display device according to yet another embodiment of the present application. As shown in FIG. 9, the display device according to this embodiment includes a processor 90, a memory 91, and a computer program 92 stored in the memory 91 and executed by the processor 90. When the processor 90 executes the computer program 92, the steps of the above-described method embodiments, such as steps 401 to 403 in FIG. 4, are implemented. Alternatively, when the processor 90 executes the computer program 92, the functions of the units in the above-described device embodiments, such as the functions of the units 131 to 133 shown in FIG. 7, are implemented.

Illustratively, the computer program 92 may be divided into one or more modules/units that are stored in the memory 91 and executed by the processor 90 to implement this application. The one or more modules/units may be a series of computer program instruction segments capable of performing particular function for describing the execution process of the computer program 92 in the display device 9. For example, the computer program 92 may be divided into a coordinate conversion table generating unit 131, a pixel data stream sampling unit 132, and a display control unit 133, and the particular functions of the units are as follows:

The coordinate conversion table generating unit 131 is used for establishing a mapping relationship between positions of respective odd and even pixels in a rotation display area of the RGB light strip and respective odd and even pixel points in the image to be displayed and generating an odd and even radius scanning coordinate conversion table.

The pixel data stream sampling unit 132 is used for performing pixel point sampling on the image to be displayed and acquiring chrominance information corresponding to the positions of the respective odd and even pixels in the rotation display area according to the odd and even radius scanning coordinate conversion table.

The display control unit 133 is used for extracting and refreshing display data of the RGB light strip according to a current rotation angle of the RGB light strip and the chrominance information corresponding to the positions of respective odd and even pixels in the rotation display area during the rotation of the RGB light strip.

The display device may include, but not limited to, a processor 90 and a memory 91. It should be understood by those skilled in the art that FIG. 9 is only an example of a display device 9 and does not constitute a limitation to the display device 9 which may include more or less components than those illustrated, or combine some components, or different components. For example, the display device 9 may further include input and output devices, network access devices, buses, and the like.

The processor 90 may be a central processing unit (CPU), a general purpose processor, a digital signal processor (DSP), an application specific integrated circuit (ASIC), a field-programmable gate array (FPGA) or other programmable logic device, discrete gate or transistor logic device, discrete hardware components, etc. The general purpose processor may be a microprocessor or the processor may alternatively be any conventional processor or the like.

The memory 91 may be an internal storage unit of the display device 9, such as a hard disk or internal memory of the display device 9. The memory 91 may alternatively be an external storage device of the display device 9, for example, a plug-in type hard disk, a smart media card (SMC), secure digital (SD) card, Flash Card, etc, equipped on the display device 9. Further, the memory 91 may alternatively include both an internal storage unit of the display device 9 and an external storage device. The memory 91 is used to store the computer program and other programs and data required by the device. The memory 91 may also be used to temporarily store data that has been output or is about to be output.

It will be apparent to those skilled in the art that, for the purpose of convenient and brief description, the above-described functional units and modules is merely an example. In practical applications, the above-described functions may be implemented by different functional units or modules according to needs, that is, the device is divided into different functional units or modules to perform all or part of the functions described above. The functional units and modules in the embodiments may be integrated into one processing unit, or each unit may exist physically separately, or two or more units may be integrated into one unit, and the integrated unit may be implemented in the form of hardware or in the form of a software functional unit. In addition, the specific names of the functional units and modules are only for the purpose of distinguishing from each other and are not intended to limit the scope of protection of the present application. For the specific working process of the units or the modules in the aforesaid system, reference may be made to the corresponding process in the aforesaid method embodiments and details are not described herein again.

In the above embodiments, the description for each embodiment has its own emphasis, and for the parts that are not detailed or described in a certain embodiment, the relevant descriptions in other embodiments may be referred to.

Those of ordinary skill in the art are able to realize that the units and algorithm steps described in the embodiments may be implemented in electronic hardware, or a combination of computer software and electronic hardware. Whether these functions are performed in hardware or software depends on the specific application and design constraints of the technical solution. A person skilled in the art may use different methods to implement the described functions for each particular application, but such implementation should not be considered to be beyond the scope of the present application.

In the embodiments provided by the present application, it should be understood that the disclosed apparatus/terminal device and method may be implemented in other manners. For example, the device/terminal device embodiment described above is merely illustrative. For example, the division of the modules or units is only a logical function division, and in an actual implementation another division may be made. For example, multiple units or components may be combined or integrated into another system, or some features may be omitted or not implemented. In addition, the mutual coupling or direct coupling or communication connection shown or discussed may be an indirect coupling or communication connection through some interface, device or unit, and may be electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, the functional units in respective embodiments of the present application may be integrated into one processing unit or exist physically separately, or two or more units may be integrated into one unit. The integrated unit may be implemented in the form of hardware or in the form of a software functional unit.

The integrated modules/units, if implemented in the form of software functional units and sold or used as separate products, may be stored in a computer readable storage medium. Based on such understanding, all or part of the processes in the aforesaid embodiments of the present application may also be completed by using computer program to instruct relevant hardware. When the computer program is executed by the processor, the steps in the various method embodiments described above may be implemented. Wherein, the computer program comprises computer program codes, which may be in the form of source code, object code, executable file or some intermediate form, etc. The computer readable medium may include any entity or device capable of carrying the computer program codes, a recording medium, a USB flash disk, a mobile hard disk, a magnetic disk, an optical disk, a computer memory, a read-only Memory (ROM), a random access memory (RAM), electrical carrier signals, telecommunication signals and software distribution medium, etc. It should be noted that the contents contained in the computer readable medium may be added or reduced appropriately according to the requirement of legislation and patent practice in a judicial district, for example, in some judicial districts, according to legislation and patent practice, the computer readable medium doesn't include electrical carrier signals and telecommunication signals.

The above-described embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently. These amendments or equivalent replacements, which won't make the essence of corresponding technical solution deviate from the spirit and the scope of the technical solution in various embodiments of the present application, should all be included in the protection scope of the present application.

What is claimed is:

1. A display method, wherein the method is applied to a display device comprising a processor; wherein the display device further comprises a rotation driving device coupled to the processor and an RGB light strip, the rotation driving device comprises a driving motor and a rotary shaft coupled to the driving motor; a center of the RGB light strip is fixed on the rotary shaft; the rotary shaft driven by the driving motor drives the RGB light strip to perform rotation display at a preset rotation step angle; the RGB light strip contains an odd radius light strip and an even radius light strip, the odd radius light strip displaying odd pixel points in an image to be displayed, the even radius light strip displaying even pixel points in the image to be displayed, the display method comprises using the processor to perform the following steps of:

establishing a mapping relationship between positions of respective odd and even pixels in a rotation display area of the RGB light strip and respective odd and even pixel points in the image to be displayed and generating an odd and even radius scanning coordinate conversion table;

performing pixel point sampling on the image to be displayed and acquiring chrominance information corresponding to the positions of the respective odd and even pixels in the rotation display area according to the odd and even radius scanning coordinate conversion table;

extracting and refreshing display data of the RGB light strip according to a current rotation angle of the RGB light strip and the chrominance information corresponding to the positions of respective odd and even pixels in the rotation display area during the rotation of the RGB light strip;

wherein after said extracting and refreshing display data of the RGB light strip according to a current rotation angle of the RGB light strip and the chrominance information corresponding to the positions of respective odd and even pixels in the rotation display area during the rotation of the RGB light strip, the method further comprises:

detecting whether an instruction to exit the rotation display is received within a preset time period in the case that the RGB light strip completes 360 degree rotation;

returning to the step of performing pixel point sampling on the image to be displayed and acquiring chrominance information corresponding to the positions of the respective odd and even pixels in the rotation display area according to the odd and even radius scanning coordinate conversion table in the case that the instruction to exit the rotation display is not received within the preset time period;

ending the process in the case that the instruction to exit the rotation display is received.

2. The display method according to claim 1, wherein said establishing a mapping relationship between positions of respective odd and even pixels in a rotation display area of the RGB light strip and respective odd and even pixel points in the image to be displayed and generating an odd and even radius scanning coordinate conversion table comprises:

establishing a plane rectangular coordinate system with the center of the image to be displayed as the origin, the length direction of the image to be displayed being the x-axis, and the width direction of the image to be displayed being the y-axis;

dividing pixel points in the image to be displayed into odd pixel points and even pixel points according to the number of the row where the pixel point locates in the image to be displayed;

acquiring coordinate values of the respective odd and even pixel points in the image to be displayed in the plane rectangular coordinate system;

converting the coordinate values of the respective odd and even pixel points in the image to be displayed into polar coordinate values via coordinate transformation;

establishing a polar coordinate system with the center of the RGB light strip as the pole;

acquiring the polar coordinate values of the positions of the respective odd and even pixels in the rotation display area of the RGB light strip in the polar coordinate system according to the rotation step angle;

establishing the mapping relationship between the positions of the respective odd and even pixels in the rotation display area and the pixel points in the image to be displayed and generating the odd and even radius scanning coordinate conversion table according to the polar coordinate values of the respective odd and even pixel points in the image to be displayed and the polar coordinate values of the positions of the respective odd and even pixels in the rotation display area.

3. The display method according to claim 1, wherein said establishing a mapping relationship between positions of respective odd and even pixels in an rotation display area of the RGB light strip and respective odd and even pixel points in the image to be displayed and generating an odd and even radius scanning coordinate conversion table comprises:

establishing a plane rectangular coordinate system with the center of the image to be displayed as the origin, the length direction of the image to be displayed being the x-axis, and the width direction of the image to be displayed being the y-axis;

dividing pixel points in the image to be displayed into odd pixel points and even pixel points according to the number of the row where the pixel point locates in the image to be displayed;

acquiring coordinate values of the respective odd and even pixel points in the image to be displayed in the plane rectangular coordinate system;

establishing a polar coordinate system with the center of the RGB light strip as the pole;

acquiring polar coordinate values of the positions of the respective odd and even pixels in the rotation display area of the RGB light strip in the polar coordinate system according to the rotation step angle;

converting the polar coordinate values of the positions of the respective odd and even pixels in the rotation display area into coordinate values via coordinate transformation;

establishing the mapping relationship between the positions of the respective odd and even pixels in the rotation display area and the pixel points in the image to be displayed and generating the odd and even radius scanning coordinate conversion table according to the coordinate values of the respective odd and even pixel points in the image to be displayed and the coordinate values of the positions of the respective odd and even pixels in the rotation display area.

4. A display device, wherein the device comprises a processor, a rotation driving device coupled to the processor and an RGB light strip; the rotation driving device comprises a driving motor and a rotary shaft coupled to the driving motor; a center of the RGB light strip is fixed on the rotary shaft; the rotary shaft driven by the driving motor drives the RGB light strip to perform rotation display at a preset rotation step angle; the RGB light strip contains an odd radius light strip and an even radius light strip, the odd radius light strip displaying odd pixel points in the image to be displayed, the even radius light strip displaying even pixel points in the image to be displayed; the processor comprises:

a coordinate conversion table generation unit used for establishing a mapping relationship between positions of respective odd and even pixels in a rotation display area of the RGB light strip and respective odd and even pixel points in the image to be displayed and generating an odd and even radius scanning coordinate conversion table;

a pixel data stream sampling unit used for performing pixel point sampling on the image to be displayed and acquiring chrominance information corresponding to the positions of the respective odd and even pixels in the rotation display area according to the odd and even radius scanning coordinate conversion table; and a display control unit used for extracting and refreshing display data of the RGB light strip according to a current rotation angle of the RGB light strip and the chrominance information corresponding to the positions of respective odd and even pixels in the rotation display area during the rotation of the RGB light strip;

wherein the processer further comprises an instruction detection unit used for:

detecting whether an instruction to exit the rotation display is received within a preset time period in the case that the RGB light strip completes 360 degree rotation;

controlling the pixel data sampling unit to perform pixel point sampling on the image to be displayed and acquire chrominance information corresponding to the positions of the respective odd and even pixels in the rotation display area according to the odd and even radius scanning coordinate conversion table again in the case that the instruction to exit the rotation display is not received within the preset time period; and turning off the rotation display function of the display device in the case that the instruction to exit the rotation display is received.

5. The display device according to claim 4, wherein the coordinate conversion table generation unit is particularly used for:

establishing a plane rectangular coordinate system with the center of the image to be displayed as the origin, the length direction of the image to be displayed being the x-axis, and the width direction of the image to be displayed being the y-axis;

dividing pixel points in the image to be displayed into odd pixel points and even pixel points according to the number of the row where the pixel point locates in the image to be displayed;

acquiring coordinate values of the respective odd and even pixel points in the image to be displayed in the plane rectangular coordinate system;

converting the coordinate values of the respective odd and even pixel points in the image to be displayed into polar coordinate values via coordinate transformation;

establishing a polar coordinate system with the center of the RGB light strip as the pole;

acquiring the polar coordinate values of the positions of the respective odd and even pixels in the rotation display area of the RGB light strip in the polar coordinate system according to the rotation step angle;

establishing the mapping relationship between the positions of the respective odd and even pixels in the rotation display area and the pixel points in the image to be displayed and generating the odd and even radius scanning coordinate conversion table according to the polar coordinate values of the respective odd and even pixel points in the image to be displayed and the polar coordinate values of the positions of the respective odd and even pixels in the rotation display area.

6. The display device according to claim 4, wherein the coordinate conversion table generation unit is particularly used for:

establishing a plane rectangular coordinate system with the center of the image to be displayed as the origin, the length direction of the image to be displayed being the x-axis, and the width direction of the image to be displayed being the y-axis;

dividing pixel points in the image to be displayed into odd pixel points and even pixel points according to the number of the row where the pixel point locates in the image to be displayed;

acquiring coordinate values of the respective odd and even pixel points in the image to be displayed in the plane rectangular coordinate system;

establishing a polar coordinate system with the center of the RGB light strip as the pole;

acquiring polar coordinate values of the positions of the respective odd and even pixels in the rotation display area of the RGB light strip in the polar coordinate system according to the rotation step angle;

converting the polar coordinate values of the positions of the respective odd and even pixels in the rotation display area into coordinate values via coordinate transformation;

establishing the mapping relationship between the positions of the respective odd and even pixels in the rotation display area and the pixel points in the image to be displayed and generating the odd and even radius scanning coordinate conversion table according to the coordinate values of the respective odd and even pixel points in the image to be displayed and the coordinate values of the positions of the respective odd and even pixels in the rotation display area.

7. A display device comprising a memory, a processor and a computer program stored in the memory and executed by the processor, wherein when the processor executes the computer program, the display device further comprises a rotation driving device coupled to the processor and an RGB light strip, the rotation driving device comprises a driving motor and a rotary shaft coupled to the driving motor; a center of the RGB light strip is fixed on the rotary shaft; the rotary shaft driven by the driving motor drives the RGB light strip to perform rotation display at a preset rotation step angle; the RGB light strip contains an odd radius light strip and an even radius light strip, the odd radius light strip displaying odd pixel points in an image to be displayed, the even radius light strip displaying even pixel points in the image to be displayed, the display method comprises using the processor to perform the following steps of:

establishing a mapping relationship between positions of respective odd and even pixels in a rotation display area of the RGB light strip and respective odd and even pixel points in the image to be displayed and generating an odd and even radius scanning coordinate conversion table;

performing pixel point sampling on the image to be displayed and acquiring chrominance information corresponding to the positions of the respective odd and even pixels in the rotation display area according to the odd and even radius scanning coordinate conversion table;

extracting and refreshing display data of the RGB light strip according to a current rotation angle of the RGB light strip and the chrominance information corresponding to the positions of respective odd and even pixels in the rotation display area during the rotation of the RGB light strip;

wherein after said extracting and refreshing display data of the RGB light strip according to a current rotation angle of the RGB light strip and the chrominance information corresponding to the positions of respective odd and even pixels in the rotation display area during the rotation of the RGB light strip, the method further comprises:

detecting whether an instruction to exit the rotation display is received within a preset time period in the case that the RGB light strip completes 360 degree rotation;

returning to the step of performing pixel point sampling on the image to be displayed and acquiring chrominance information corresponding to the positions of the respective odd and even pixels in the rotation display area according to the odd and even radius scanning coordinate conversion table in the case that the instruction to exit the rotation display is not received within the preset time period;

ending the process in the case that the instruction to exit the rotation display is received.

* * * * *